United States Patent [19]
Patton et al.

[11] Patent Number: 5,717,972
[45] Date of Patent: Feb. 10, 1998

[54] PHOTOGRAPHIC MEDIUM CARTRIDGE WITH CHEMICALLY ACTIVATED STATUS INDICATOR

[75] Inventors: David L. Patton, Webster; Virginia M. Moszkowicz, Honeoye Falls; William G. Hoyt, Churchville; Edgar G. Earnhart, Hilton, all of N.Y.

[73] Assignee: Eastman Kodak Company, Rochester, N.Y.

[21] Appl. No.: 774,939

[22] Filed: Dec. 19, 1996

[51] Int. Cl.$^6$ ................................................. G03B 17/26
[52] U.S. Cl. .................................... 396/515; 116/206
[58] Field of Search ........................... 396/515; 242/563; 116/200, 206, 212

[56] References Cited

U.S. PATENT DOCUMENTS

| | | | |
|---|---|---|---|
| 3,463,532 | 8/1969 | Chidley et al. | 292/307 |
| 4,511,052 | 4/1985 | Klein et al. | 215/230 |
| 4,685,579 | 8/1987 | Stapleton | 215/230 |
| 4,883,182 | 11/1989 | Hughes | 206/534 |
| 5,278,600 | 1/1994 | Takahashi et al. | 354/275 |
| 5,285,227 | 2/1994 | Lawther et al. | 354/275 |
| 5,351,101 | 9/1994 | Janson, Jr. | 354/21 |
| 5,517,268 | 5/1996 | Stephany | 396/515 |
| 5,587,756 | 12/1996 | Mehra et al. | 396/515 |

*Primary Examiner*—Howard B. Blankenship
*Attorney, Agent, or Firm*—Charles E. Snee, III

[57] ABSTRACT

A cartridge (10) of photographic medium includes a housing (14–24) having an interior volume (15); an exit slit (26) from the interior volume to an exterior of the housing; a photographic medium element (12) enclosed within the interior volume; an indicator (36–44) supported by one of the housing and the medium element, the indicator being responsive to a liquid reagent to change color and provide a visible indication of a status of the medium element; a source (46–52; 72–76; 90; 112) of the liquid reagent supported by the one of the housing and the medium element; and means (32, 34, 54–62; 778–86; 94–100; 22, 26, 28, 110) for causing flow of the reagent to the indicator upon movement of the medium element through the exit slit, whereby the indicator will change color and indicate the status. An indicator apparatus for mounting on a cartridge and a photographic medium supporting an indicator and source of reagent also are disclosed.

49 Claims, 10 Drawing Sheets

PHOTOGRAPHIC MEDIUM CARTRIDGE WITH CHEMICALLY ACTIVATED STATUS INDICATOR

TECHNICAL FIELD

The invention relates to a cartridge for web material, the cartridge having an indicator to show the status of the web material. More particularly, the invention relates to such a cartridge for a light-sensitive medium, such as a photographic filmstrip or film sheet or a roll of photographic paper, in which the indicator is activated chemically in response to movement of the medium from or into the cartridge, or both.

BACKGROUND OF THE INVENTION

Conventional cartridges for photographic filmstrips are known which include a supply spool onto which a filmstrip is wound, a surrounding cylindrical shell, suitable closures or caps at opposite ends of the shell, an exit slit through which the filmstrip may be withdrawn from or wound into the cartridge, and a suitable light-locking feature at the exit slit. In a well-known cartridge for 35 mm filmstrips, the light-locking feature comprises a pair of strips of plush material mounted on opposite sides of the exit slit to engage the filmstrip and prevent leakage of light into the cartridge. Advanced cartridges are also known which include a light-locking door at the exit slit, rather than strips of plush material. At assembly of a cartridge using strips of plush material, a leading portion of the filmstrip is left extended through the exit slit to facilitate loading into a camera. In advanced cartridges, the entire filmstrip is wound into the cartridge and the door is closed, not to be opened until the cartridge has been installed in a camera.

To load most 35 mm cameras, a conventional film cartridge is inserted into a loading chamber on one side of a camera and the leading portion of the filmstrip is placed over a take-up spool on an opposite side. In some cameras, the leading portion must be manually attached to the take-up spool before a rear door of the camera is closed. Then, a film loading operation is performed by the user of the camera, for example, by manually pivoting or rotating a winding lever to rotate the take-up spool and depressing a shutter release button several times, until a sufficient length of the leading portion has been wound onto the take-up spool and the first frame has been properly positioned for exposure. In other 35 mm cameras, the leading portion is automatically secured to the take-up spool at the beginning of a film loading operation. For example, the take-up spool is rotated by a motor drive and one or more teeth of the spool engage perforations in the leading portion to wind the leading portion onto the spool until the first frame has been properly positioned. A spring-like deflector or similar feature may be provided on the rear door to press the leading portion against the take-up spool to ensure proper engagement with the teeth of the spool.

A problem that exists in some 35 mm cameras is that the leading portion of the filmstrip from a conventional cartridge may not properly engage with the take-up spool before the rear door is closed or may become disengaged after the door is closed. Since the rear door of the camera is closed, the user may not be aware of this situation. Thus, the filmstrip will not be wound onto the take-up spool; and neither the first nor subsequent frames will be positioned for exposure. So, a need has existed for a cartridge feature for indicating when a conventional 35 mm filmstrip has been properly loaded into a camera. Such a feature could be visible to a user of a camera, for example, through a conventional small window in the camera back. Such windows already are provided on some cameras to permit viewing of information printed on the cartridge.

After all exposures have been made on such a conventional 35 mm filmstrip, the filmstrip is wound back into the cartridge; and the cartridge is removed from the camera. Typically, the entire filmstrip is wound past the strips of plush material and completely into the cartridge; so that, the leading portion is no longer visible or accessible to the user. Some cameras will leave a short length of film extended from the cartridge upon rewind. Thus, a conventional 35 mm cartridge without a visible leading portion typically can be assumed to contain a filmstrip which has been fully exposed. However, a problem is that a user occasionally may neglect to wind an exposed filmstrip completely into a conventional cartridge; so that, some of the leading portion is left extended from the exit slit. In such a case, once the conventional cartridge of exposed film has been removed from the camera, the user may not be able to distinguish it from a cartridge of unexposed film also having a leading portion extended from its exit slit. Thus, the user may accidentally load a cartridge of exposed film into a camera and produce a filmstrip of useless double exposures. Moreover, users sometimes accidentally rotate the spool of a cartridge of unexposed film; so that, the leading portion is drawn into the cartridge, making it impossible to distinguish such a cartridge of unexposed film from one of exposed film. Thus, the user may send a cartridge of unexposed film for developing and printing and waste an entire filmstrip. So, a need has existed for a cartridge feature for indicating whether a conventional 35 mm filmstrip is exposed or unexposed.

SUMMARY OF THE INVENTION

The primary objective of the invention is to provide a cartridge for a strip or sheet of web material, such as photographic film or photographic paper, the cartridge including an indicator to show the status of the web material.

A further objective is to provide such a cartridge for photographic film or paper in which the indicator shows whether the film or paper is exposed or unexposed.

Another objective is to provide such a cartridge for photographic film in which the indicator shows whether the film has been successfully loaded into a camera.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

In accordance with our invention, a cartridge of photographic medium includes a housing having an interior volume; an exit slit from the interior volume to an exterior of the housing; a photographic medium element enclosed within the interior volume; an indicator supported by one of the housing and the medium element, the indicator being responsive to a liquid or flowable reagent to change color and provide a visible indication of a status of the medium element; a source of the liquid reagent supported by the same one of the housing and the film element; and means for causing flow of the reagent to the indicator upon movement of the medium element through the exit slit, whereby the indicator will change color and indicate the status. The medium may be photographic film or paper in sheet or strip form. The indicator may include a substrate capable of absorbing the reagent; and at least one symbol supported by the substrate, the symbol comprising a material which changes color upon exposure to the reagent when the reagent is absorbed by the substrate.

In a first embodiment, the medium element is a photographic filmstrip having a longitudinally extended array of perforations; the indicator and the source are supported by the housing; the source comprises a flexible container of the reagent, the container having an outlet to the indicator; and the means for causing comprises a pump lever pivotably supported by the housing, the pump lever being engaged with the flexible container and having an end engaged with the filmstrip at the array of perforations, whereby the movement of the filmstrip causes the pump lever to oscillate as the end moves across the perforations, thereby pressing and expanding the flexible container to expel the reagent to the indicator. The flexible container may include a valve for admitting air when the pump lever expands the flexible container.

In a second embodiment, the medium element comprises a perforation; the indicator and the source are supported by the housing; the source includes a container of the reagent having an outlet to the indicator; and the means for causing comprises a plug member for closing the outlet, a pulling member engaged with the plug member, and a catch member for engaging the perforation, the catch member being connected with the pulling member, whereby movement of the filmstrip causes the catch member to engage the perforation, thereby moving the pulling member and extracting the plug member from the outlet to release the reagent to the indicator. The plug member is positioned within the container and the pulling member extends through a wall of the container opposite the outlet to engage the plug member. The container may have an internal cross-sectional area greater than a flow area of the outlet, whereby the reagent can flow past the plug to the outlet after the plug is extracted from the outlet. The pulling member may be adapted to break when the perforation has moved a predetermined distance from the exit slit, so that the catch member can disengage from the perforation.

In a third embodiment, the medium element includes a perforation; the indicator and the source are supported on the housing; the source comprises a capillary enclosing a quantity of the reagent, the capillary having a closed end and an outlet to the indicator; and the means for causing comprises a catch member for engaging the perforation, the catch member being connected to the capillary adjacent the closed end, whereby movement of the medium element causes the catch member to engage the perforation, thereby breaking or cracking the capillary to release the reagent to the indicator. The catch member may be formed at least in part from a portion the capillary. The capillary may be adapted to break when the perforation has moved a predetermined distance from the exit slit, whereby the catch member can disengage from the perforation.

In a fourth embodiment, the indicator and the source are supported on the medium element; the source comprises a flexible container of the reagent, the container having an outlet to the indicator; and the means for causing comprises an edge of the exit slit which engages and presses the flexible container to expel the reagent to the indicator as the film element moves into the housing. A strip of light-lock material may be supported within the exit slit at the edge, so that the material engages the container.

An article of manufacture according to the invention includes a photographic medium element; an indicator supported by the medium element, the indicator being responsive to a liquid reagent to change color and provide a visible indication of a status of the medium element; a source of the liquid reagent supported by the medium element; and a conduit between the indicator and the source. The source may include a flexible container of the reagent, the container having an outlet to the indicator. The medium element may be a sheet or strip of photographic film or paper. The indicator may include a substrate capable of absorbing the reagent; and at least one symbol supported by the substrate, the symbol comprising a material which changes color upon exposure to the reagent when the reagent is absorbed by the substrate.

An indicator apparatus according to the invention is useful for showing a status of a photographic medium element which is enclosed in a housing. As such, the indicator apparatus may include an indicator adapted to be supported by one of the housing and the medium element, the indicator being responsive to a liquid or flowable reagent to change color and provide a visible indication of a status of the medium element; a source of the liquid reagent adapted to be supported by the same one of the housing and the medium element; and means for causing flow of the reagent to the indicator upon movement of the medium element from the housing, whereby the indicator will change color and indicate the status. The indicator, source and means for causing flow may include the features previously mentioned with regard to the four embodiments of a cartridge in accordance with the invention.

The invention provides various advantages. When a cartridge embodying the invention has been properly loaded into a camera, an indication automatically becomes visible through a window in the camera to show that loading has been completed. An unexposed or loaded indicator will discourage a user from opening a camera before all exposures have been made. Later, when the cartridge is removed from the camera, the same indication will show the user that the cartridge previously has been loaded and, presumably, exposed. With cartridges in which the indicator is activated after the filmstrip has been exposed, an indication automatically becomes visible to the user to prevent reloading and double-exposing the film. If an unexposed cartridge accidentally is sent to a photofinisher, the indicator should prevent the unexposed film from being processed. Less expensive cameras can be made since electronic sensors are not required to detect proper loading or completion of all exposures. The indicator may be provided with internationally understood symbols or icons to show the status of the film.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

The following is a detailed description of the preferred embodiments of the invention, reference being made to the drawings in which the same reference numerals identify the same elements of structure in each of the several Figures.

Figure 1:
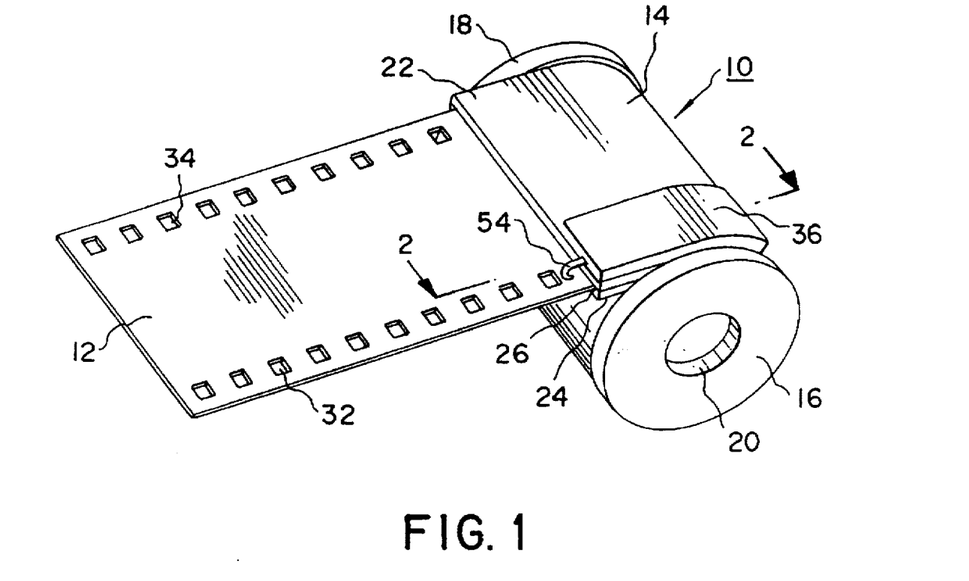
FIG. 1 shows a perspective view of a cartridge of photographic film including one embodiment of an indicator in accordance with the invention.

FIGS. 1 to 5 show a first embodiment of the invention. FIG. 1 shows a conventional cartridge 10 such as commonly used for 35 mm photographic film. Although this description will refer mainly to cartridges enclosing filmstrips wound onto a spool, those skilled in the art will appreciate that the chemically activated visual indicators according to the invention could readily be used with other web materials bearing light-sensitive, photographic media, such as photographic paper. The skilled persons further will appreciate that the indicators also could readily be used with cartridges for sheets of web material such as photographic film or paper. Of course, the indicators could just as readily be used for cartridges of many other types of web materials.

Figure 2:
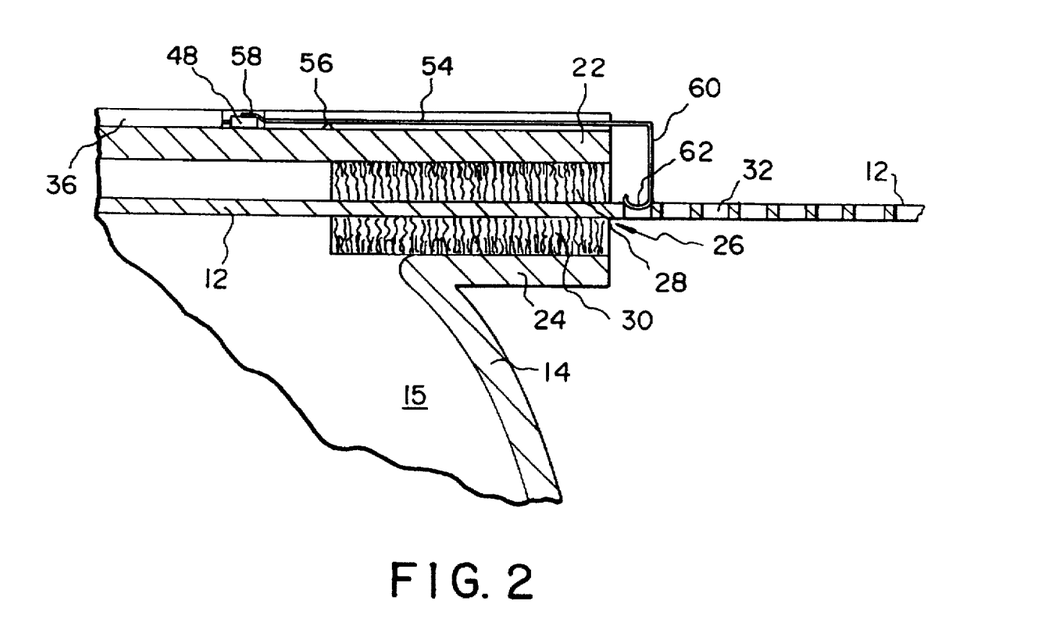
FIG. 2 shows an enlarged, sectional and fragmentary view along line 2—2 of FIG. 1.

Cartridge 10 encloses a strip or sheet 12 of web material such as a photographic medium element like a filmstrip or sheet. A hollow cartridge body or housing 14 encloses the medium element in an interior volume 15 and is closed by a pair of end caps 16, 18. Openings through the end caps, such as opening 20, provide access in the familiar manner to an enclosed spool for the filmstrip. Housing 14 includes a pair of parallel lips 22, 24 between which an exit slit 26 is defined, through which strip 12 can be pulled from or wound into the cartridge. To prevent leakage of light into the cartridge, as shown in FIG. 2, a pair of conventional strips 28, 30 of black velvet plush are attached to the inside surfaces of lips 22, 24. A longitudinally extended array of perforations 32, 34 may be provided along one or both edges of strip 12 in the conventional manner. Strip 12 is shown as it would be when initially loaded into a camera, with only a short leading portion of film extended past lips 22, 24. The Figures of this description show the cartridge and indicator on a greatly expanded scale, for ease of illustration. Those skilled in the art will appreciate that the actual dimension, for example, from lip 22 to the centerline of strip 12 of a cartridge of 35 mm film would be on the order of a fraction of a millimeter or so.

Figure 3:
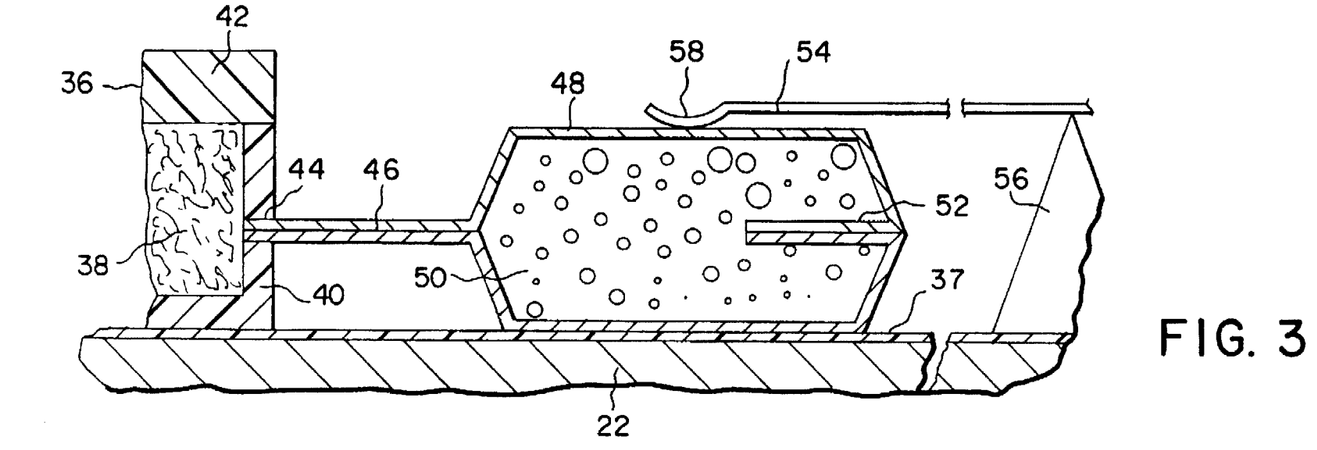
FIG. 3 shows an enlarged, sectional and fragmentary view of the indicator and source of reagent of FIG. 2.

A chemically activated visible indicator 36 is supported on an exterior surface of housing 14 and may be attached by any convenient method such as an adhesive carrier sheet 37 shown schematically in FIG. 3. Indicator 36 may comprise an absorbent substrate 38 sandwiched between a liquid-tight base receiver 40 affixed to the carrier sheet and a transparent cover 42 sealed to the receiver. Substrate 38 for example may be an absorbent paper which supports a substance which will change color when activated by a liquid reagent absorbed by the substrate. By "support" is meant that that the color change substance may be impregnated into the full volume of the substrate, or may be printed as symbols or letters onto surface portions of the substrate, or may be applied to the substrate in any convenient manner. Substances and liquid or flowable reagents which exhibit this type of behavior are well known. For example, bromocresol green (3', 3", 5', 5"-tetrabromo-m-cresol-sulfonephthalein) can be prepared in a water solution and absorbed onto substrate 38, to provide a substrate with a yellow color. The entire substrate may be wetted with the solution, or selected symbols, icons or complete words may be stamped or printed or otherwise supported on the substrate using the solution. When such a substrate is wetted with liquid reagent having a pH in a range of 3.8 to 5.4, the color changes from yellow to blue green. Other known combinations may include colorless potassium ferrocyanide and colorless ferric alum which produce a deep blue color when mixed; colorless potassium thiocyanate and colorless ferric alum which produce a bright red when mixed; anhydrous copper sulfate which turns deep blue when water is added; anhydrous cobalt chloride which turns from blue to red when water is added; and phenolphthalein which is colorless in neutral or acidic media but turns red in basic media.

An opening 44 in receiver 40 accepts a collapsible outlet conduit 46 from a source of liquid reagent, such as a flexible container or bladder 48 affixed to carrier sheet 37. In each of the embodiments of the invention, the indicator and source of reagent conveniently may be mounted on the carrier sheet to adapt them for separate assembly prior to installation on a cartridge. Alternatively, the indicator and source may be adapted by suitable adhesive to be individually mounted on the cartridge or, in the fourth embodiment, on the medium element. An absorbent material 50, such as sponge or fiber mat, may be provided within container 48 to absorb a liquid reagent suitable to change the color of the substance supported by substrate 38. Opposite outlet conduit 46, container 48 includes a collapsible air inlet conduit 52 which functions as a one-way valve to admit air to the container. A pump lever 54 is supported by a pivot 56 affixed to the carrier sheet. One end 58 of the pump lever engages and preferably is attached to flexible container 48, such as by adhesive.

Lever 54 includes a downwardly extended leg 60 having a curved end 62 which is sized to enter only partially into perforations 32.

Figure 4:
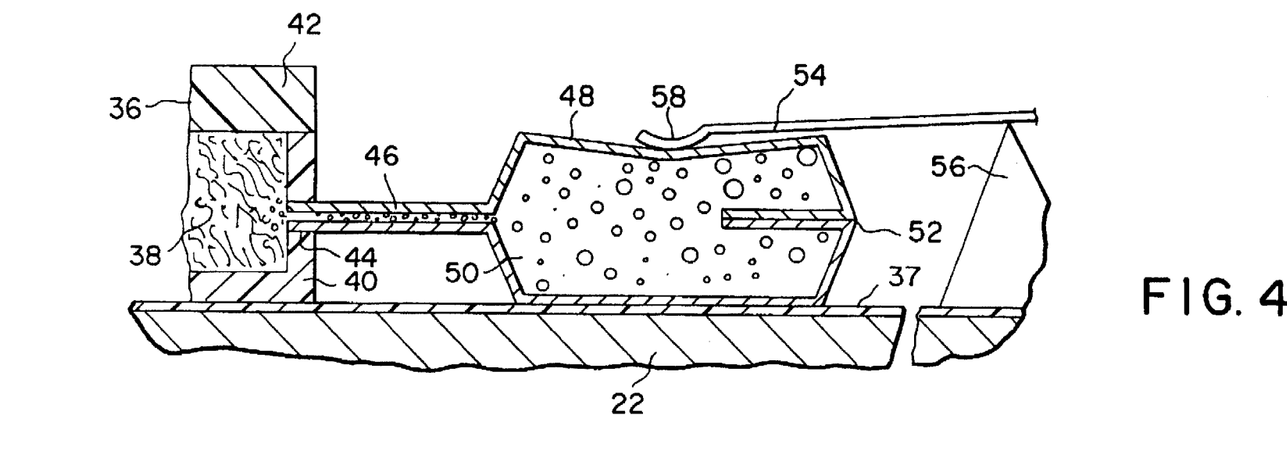
FIG. 4 shows the structure of FIG. 3 when the source has been pressed to expel reagent to the indicator.
Figure 5:
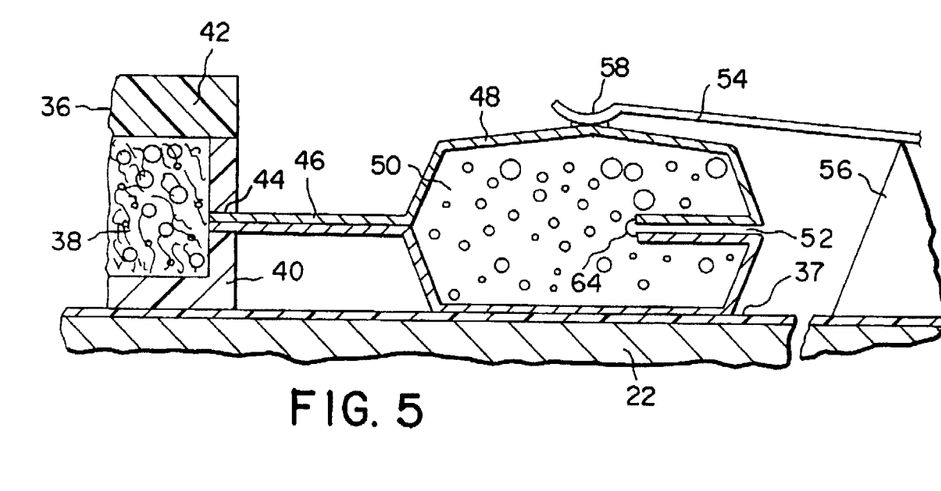
FIG. 5 shows the structure of FIG. 3 when the source has been released to draw air into the source.
Figure 6:
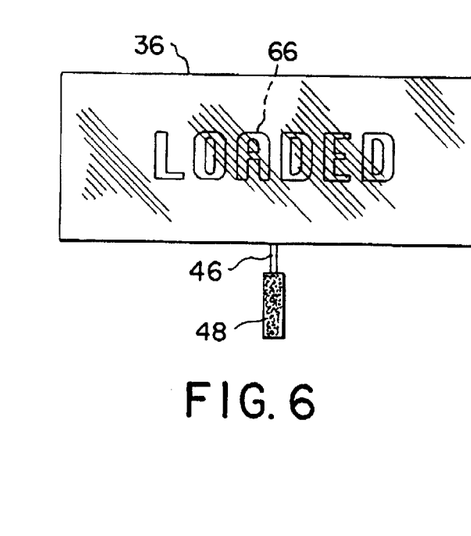
FIG. 6 schematically shows an indicator before activation by the reagent.
Figure 7:
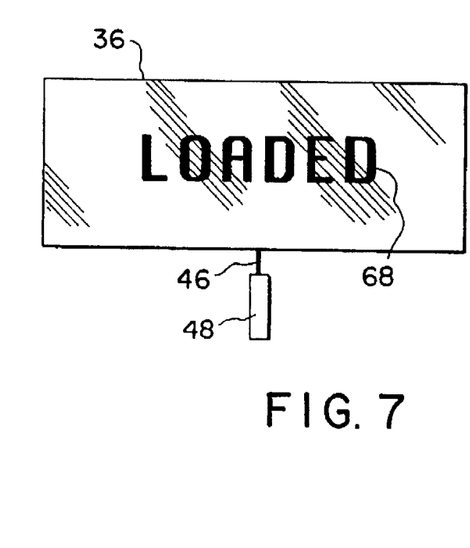
FIG. 7 schematically shows an indicator after activation by the reagent.
Figure 8:
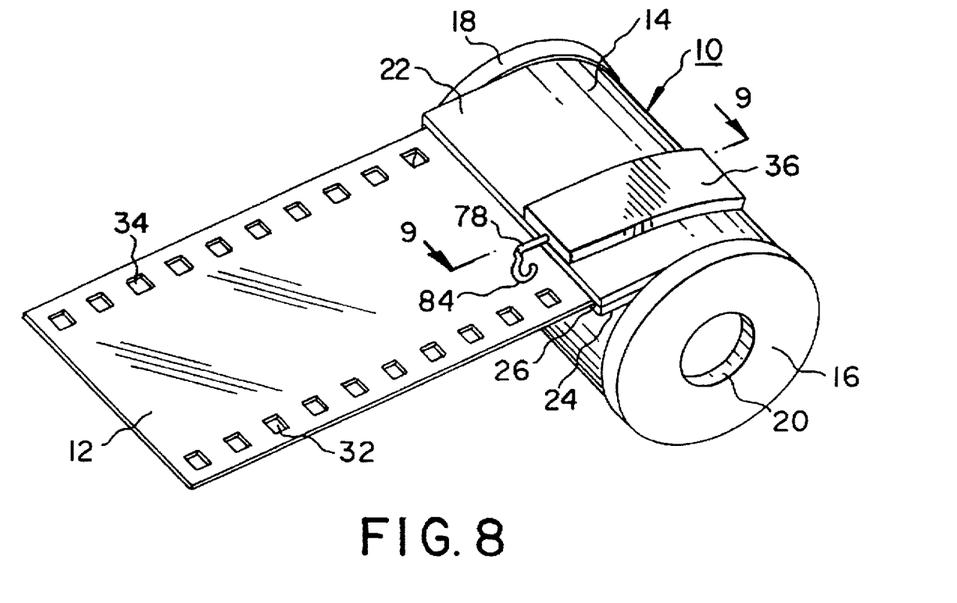
FIG. 8 shows a perspective view of a cartridge of photographic film including a second embodiment of an indicator in accordance with the invention.
Figure 9:
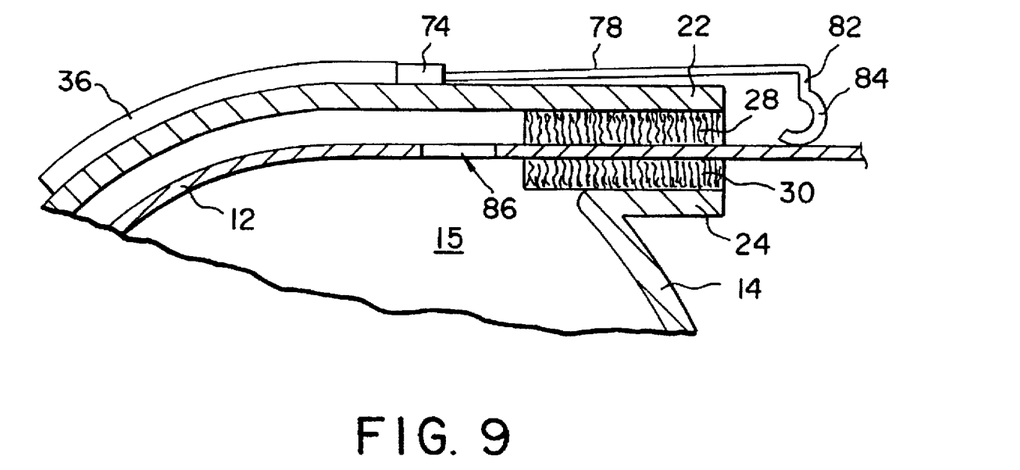
FIG. 9 shows an enlarged, sectional and fragmentary view along line 9—9 of FIG. 8.

In operation of the embodiment of FIGS. 1 to 5, medium element 12 is moved between the lips of cartridge 10 during loading of the medium into an associated apparatus such as a camera. This movement causes curved end 62 alternately to move partially into and then to ride out of successive perforations 32, thereby imparting an oscillating movement to pump lever 54. This movement causes end 58 alternately to press and expand the flexible container, as shown in FIGS. 4 and 5, respectively. When the flexible container is pressed, conduit 46 opens in response to an increase in pressure within the container and allows the liquid reagent to be expelled to indicator 36. When the flexible container is expanded, conduit 46 closes. As the container attempts to flex back to its original shape, conduit 52 opens to admit air to the container, as indicated by an air bubble 64. Continued pressing and expanding of the container are effective to pump the reagent from the container to the indicator. Thus, by a time when the medium is properly loaded into the associated apparatus, enough reagent will have reached the indicator to cause the desired color change. FIGS. 6 and 7 illustrate schematically how indicator 36 can change in appearance. In FIG. 6, the reagent remains in container 48 and a series of unactivated symbols 66 are supported on substrate 38, such as the letters "LOADED." In FIG. 7, the reagent has been expelled from container 48 into indicator 36 and the color of symbols 66 has changed, as indicated by activated symbols 68.

Although, in the embodiment of FIGS. 1 to 7, pump lever 54 is oscillated due to its interaction with conventional edge perforations 32, the necessary perforations could be provided at other transverse locations on element 12. For example, if it were desired to indicate proper loading into a camera, the perforations could be provided in a short, longitudinally extended array, not illustrated, more centrally located on a leading portion of element 12 ahead of the image areas to be exposed in the camera. Indicator 36 and pump lever 54 would then be positioned more centrally on lip 22, in order to engage the shorter array. However, the arrangement shown in FIG. 1 has the advantage that end 62 does not engage the medium in an image area. Or, if it were desired to indicate that the medium has been exposed in a camera, the perforations could be provided in a short, longitudinally extended array, not illustrated, more centrally located on a trailing portion of element 12 after the image areas to be exposed. In the latter instance, the indicator would not be actuated until all exposures have been made; so, symbols 66, 68 could indicate "EXPOSED" rather than "LOADED."

FIGS. 8 to 11 show a second embodiment of the invention. Base receiver 40 of indicator 36 is affixed to carrier sheet 37. An opening 70 through a side of the receiver accepts a sealing plug 72. Adjacent to indicator 36 and affixed to carrier sheet 37 is a source of liquid reagent, such as a container 74 filled with the reagent. The container has an outlet opening 76 which also is closed by sealing plug 72. Alternatively, only opening 76 may be closed by the plug. A pulling member 78, such as a thin rod, is attached at one end to plug 72 and passes with a sliding seal through an opening 80 in container 74 directly opposite opening 76. Pulling member 78 extends beyond lip 22 and includes a downwardly extended leg 82 which ends in a catch member or hook 84. Medium element 12 is provided with a single perforation 86 located ahead of the image areas to be exposed, to receive and pass hook 84 when element 12 has been withdrawn a predetermined distance sufficient for proper loading into an associated apparatus such as a camera. Alternatively, perforation 86 could be located after the image areas to receive and pass hook 84 after all exposures have been made. In either event, indicator 36 would be of the type described with regard to FIGS. 3, 6 and 7.

Figure 10:
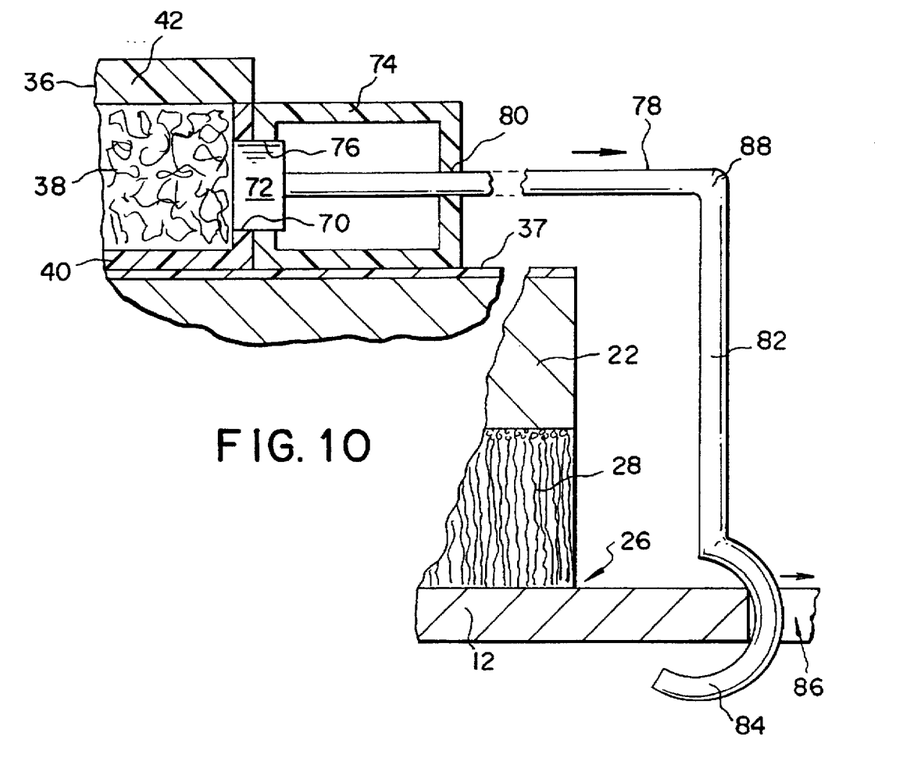
FIG. 10 shows an enlarged, sectional and fragmentary view of the indicator and source of reagent of FIG. 9 before release of the reagent.
Figure 11:
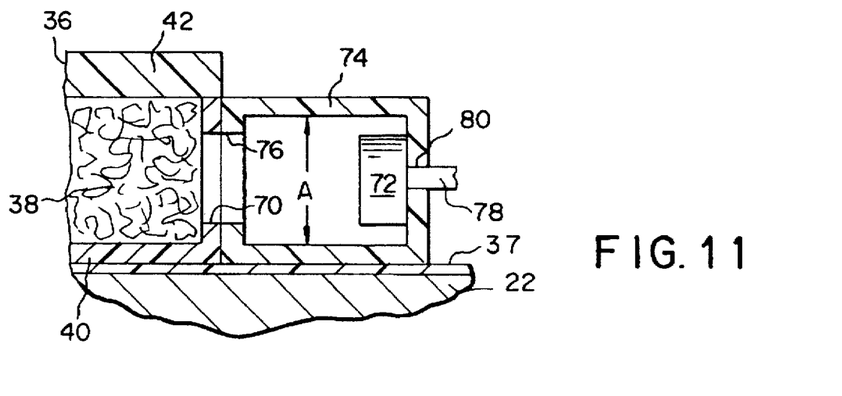
FIG. 11 shows an enlarged, sectional and fragmentary view of the indicator and source of reagent of FIG. 9 after release of the reagent.
Figure 12:
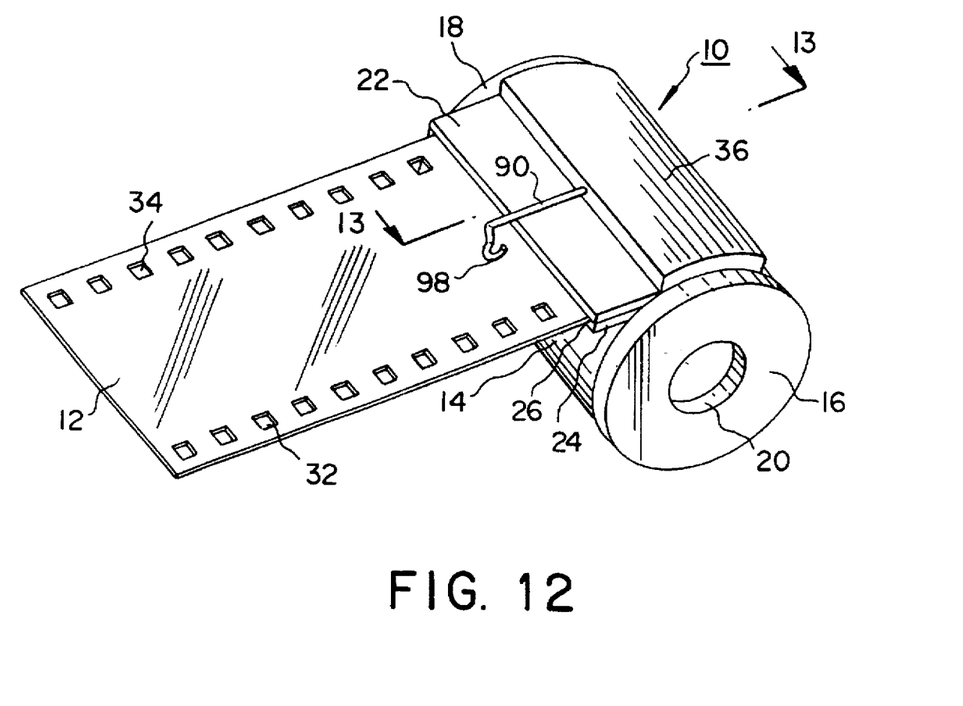
FIG. 12 shows a perspective view of a cartridge of photographic film including a third embodiment of an indicator in accordance with the invention.
Figure 13:
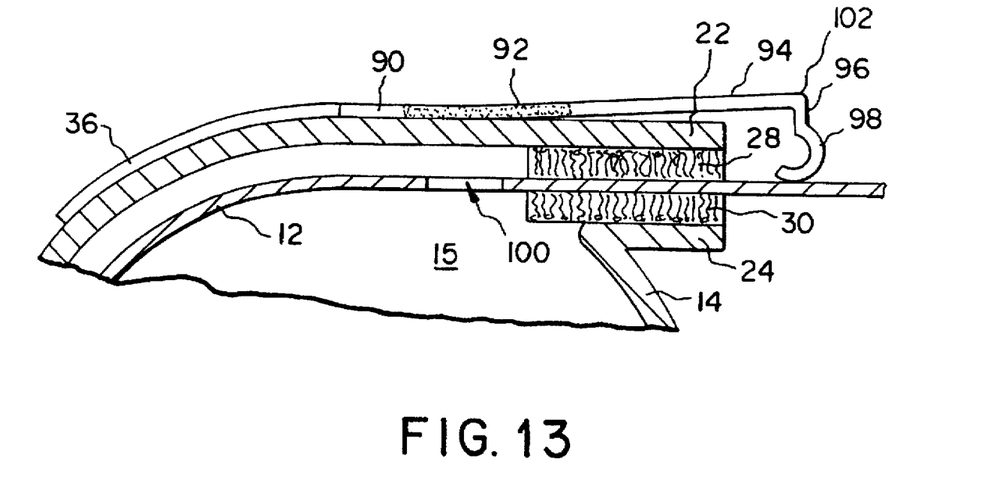
FIG. 13 shows an enlarged, sectional and fragmentary view along line 13—13 of FIG. 12 before release of the reagent.
Figure 14:
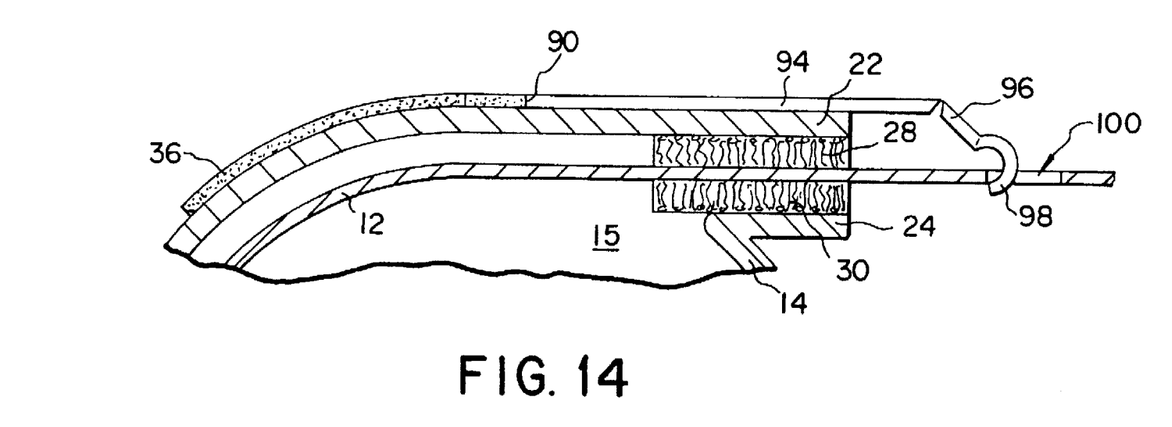
FIG. 14 shows the structure of FIG. 13 after release of the reagent.
Figure 15:
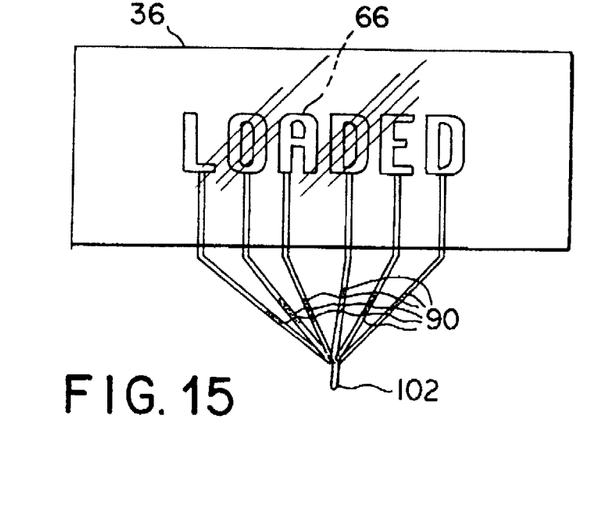
FIG. 15 schematically shows an indicator of the embodiment of FIG. 12 before activation by the reagent.
Figure 16:
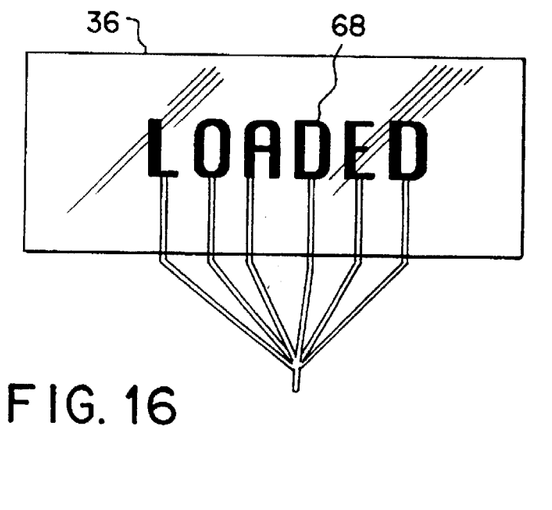
FIG. 16 schematically shows an indicator of the embodiment of FIG. 12 after activation by the reagent.

In operation of the embodiment of FIGS. 8 to 11, medium element 12 is moved between the lips of cartridge 10 during loading of the medium into an associated apparatus such as a camera. Eventually, hook 84 drops into perforation 86, as shown in FIG. 10. Continued movement of the medium element causes hook 84 to engage a trailing edge of perforation 86; so that, the medium element begins to pull on member 78 which in turn pulls on plug 72, thereby removing the plug from openings 70, 76 and moving the plug to the position of FIG. 11. Container 74 has an interior dimension A which is larger than a diameter of plug 72. As a result, liquid reagent within container 74 can flow past plug 72 as the plug moves from the position of FIG. 10 to that of FIG. 11. The liquid reagent then passes through openings 70, 76 to be absorbed by medium 38 within indicator 36. Continued movement of medium element 12 pulls on member 78 such that stress concentrates at a corner 88 between pulling member 78 and downward leg 82, eventually causing a break at the corner, as indicated schematically for the similar structure of FIG. 14. To facilitate such breaking of member 78, the member may be notched at corner 88 or made from a material such as polystyrene or glass, or both. After the break has occurred, hook 84 can ride out of perforation 86 as the medium element moves past. Alternatively, member 78 could be provided with a thin section which will tear when hook 84 has moved sufficiently far. Preferably, hook 84 should remain attached to member 78 after the break, as shown in FIG. 14. To maintain such attachment, member 78 may be coated or laminated, at least at corner 88, with a resilient substance such as polyethylene which will not break with the rest of the member. Or member 78 could include an embedded wire or fiber which would not break.

FIGS. 12 to 16 show a third embodiment of the invention. In this instance, a capillary tube 90 constitutes a source of liquid reagent. Rather than a conventional capillary tube, a porous rod having a sealed exterior could be used. Prior to assembly, a quantity 92 of liquid reagent is drawn into the capillary and one end of the capillary is sealed. An opposite, open end of the capillary is extended into an opening of indicator 36, such as opening 44 in FIG. 3. An extension 94 of the capillary extends beyond lip 22 and joins a downwardly extended leg portion 96 which ends in a catch member or hook 98. Medium element 12 is provided with a single perforation 100 located ahead of the image areas to be exposed, to receive and pass hook 98 when element 12 has been withdrawn a predetermined distance sufficient for proper loading into an associated apparatus such as a camera. Alternatively, perforation 100 could be located after the image areas to receive and pass hook 98 after all exposures have been made. In either event, indicator 36 could be of the type described with regard to FIGS. 3, 6 and 7. As an alternative to the single capillary shown in FIGS. 12 to 14, a plurality of separate capillaries 90 may be provided for each symbol 66, 68, as shown schematically in FIGS. 15 and 16. In this arrangement, the closed ends of the capillaries are joined at a common knee or corner 102 between their respective portions 94 and a single downward leg 96.

In operation of the embodiment of FIGS. 12 to 16, medium element 12 is moved between the lips of cartridge 10 during loading of the medium into an associated apparatus such as a camera. Eventually, hook 98 drops into perforation 100. Continued movement of the medium element causes hook 98 to engage a trailing edge of perforation 100; so that, the capillary flexes and stress concentrates at corner 102 between extension 94 and downward leg 96, eventually causing a break or crack in the capillary or capillaries at the corner, as indicated schematically in FIG. 14. After the break has occurred, the reagent within the capillary will flow into indicator 36 where it will absorb quickly into substrate 38. During continued movement of element 12, hook 98 eventually can ride out of perforation 100 as the medium element moves past.

FIGS. 17 to 21 show a fourth embodiment of the invention. In this case, indicator 36 is affixed to carrier sheet 37 which is supported on a leading portion of the medium element. The leading portion is extended outside cartridge 10 as delivered to a user. A collapsible outlet conduit 110 extends from a source of liquid reagent, such as a flexible container or bladder 112 also supported on carrier sheet 37 between the indicator and lips 22, 24. An absorbent material 114 may be provided within container 112 to hold the liquid reagent. Conduit 110 is extended into an opening 44 in indicator 36. The indicator may be of the type shown in FIGS. 6 and 7, but with the symbols 66, 68 indicating "EXPOSED."

Figure 17:
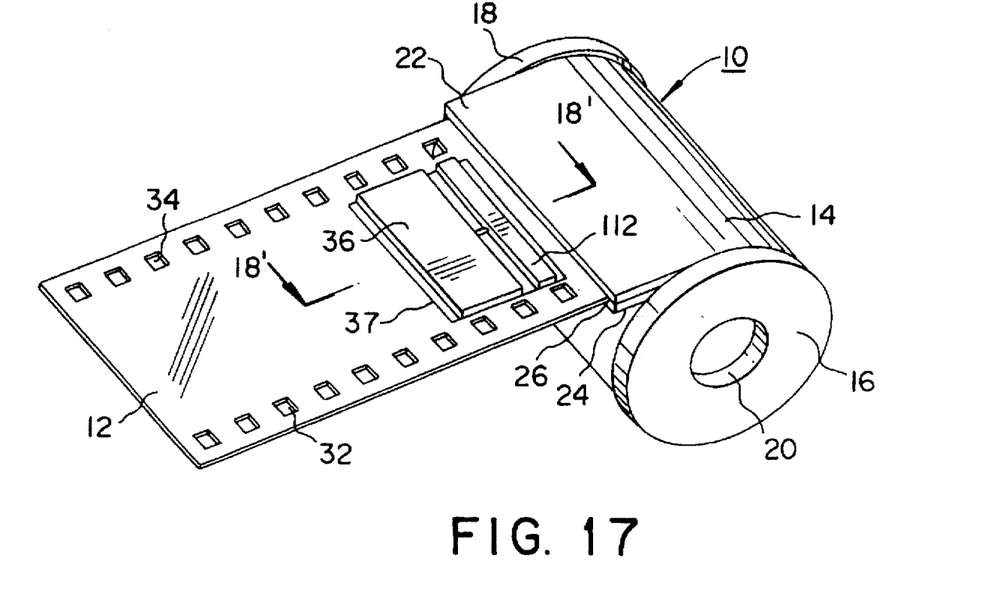
FIG. 17 shows a perspective view of a cartridge of photographic film including a fourth embodiment of an indicator in accordance with the invention.
Figure 18:
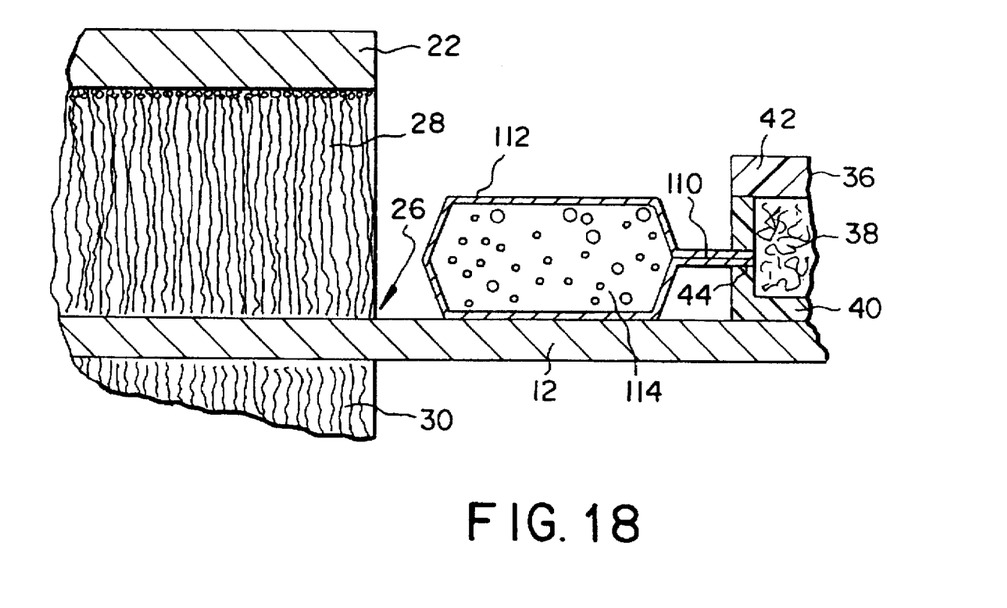
FIG. 18 shows an enlarged, sectional and fragmentary view along line 18'—18' of FIG. 17 before release of the reagent.
Figure 19:
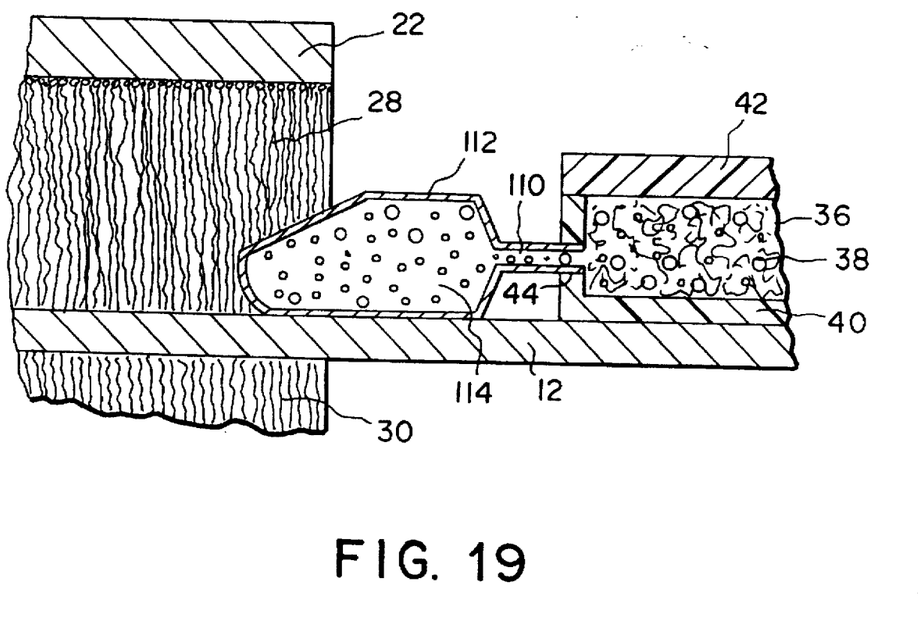
FIG. 19 shows the structure of FIG. 18 during release of the reagent.

In operation of the embodiment of FIGS. 17 to 19, the cartridge is loaded into an associated apparatus, such as a camera, and element 12 is advanced to make exposures. The leading end is wound onto a take-up spool within a camera, not illustrated. Winding onto the take-up spool may produce enough pressure between convolutions to force some of the liquid reagent into indicator 36. This is acceptable since the objective is to cause the indicator ultimately to show "EXPOSED" to the user. After all exposures have been made, medium element 12 is wound back into the cartridge. This causes container 112 to pass between lips 22, 24 and strips 28, 30; so that, the container is compressed and a quantity of liquid reagent is squeezed out into indicator 36, causing the indication "EXPOSED" to appear. Thus, if the user fails to wind the medium all the way back into the cartridge and later attempts to reload the cartridge, the indication will appear and the user will be prompted to remove the cartridge, thus avoiding double exposure.

Figure 20:
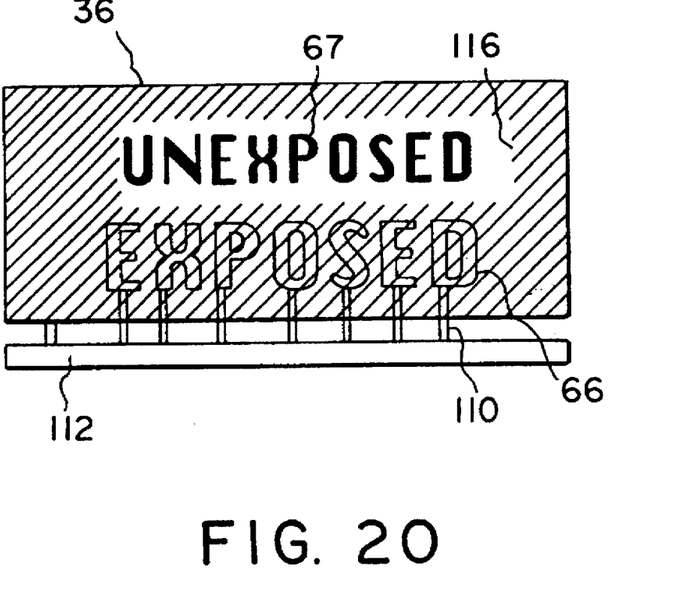
FIG. 20 schematically shows an indicator of the embodiment of FIG. 17 before activation by the reagent.
Figure 21:
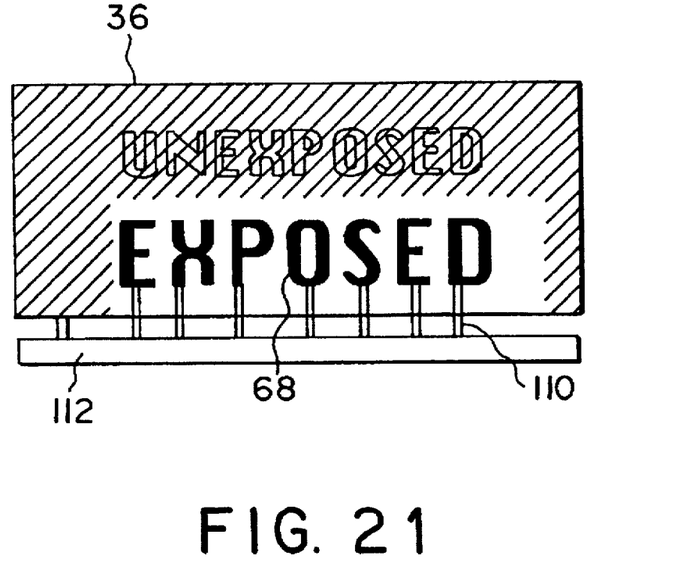
FIG. 21 schematically shows an indicator of the embodiment of FIG. 17 after activation by the reagent.

FIGS. 20 and 21 show an alternative form of indicator 36 which can be used in all embodiments of the invention. In this instance, substrate 38 initially supports two sets of symbols or letters of different meaning. Unactivated letters 66 of a color change substance are provided for "EXPOSED"; and contrasting color letters 67 are provided for "UNEXPOSED." The background of the contrasting color letters also is treated with the same color change substance. The contrasting color letters are printed in a color essentially matching the color to which the color change substance will change when exposed to the liquid reagent. Cover 48 is colored to match unactivated letters 66 before they are exposed to the liquid reagent, which makes letters 66 initially invisible. Cover 48 also may include a clear, colorless portion 116 above the contrasting color letters, which makes letters 67 initially more readily visible. However, portion 116 may not be needed in all instances. When container 112 is compressed, reagent flows through a single conduit as in the indicator of FIGS. 6 and 7 or through multiple conduits 110 as in FIGS. 20 and 21. The unactivated letters then become visible through cover 48 as shown in FIG. 21. At the same time, the background of the initially contrasting color letters changes color to essentially match that of the letters, thus rendering them essentially invisible.

Parts List 10 cartridge
12 photographic medium element
14 hollow cartridge body or housing
15 interior volume of 14
16, 18 end caps
20 opening for access to spool
22, 24 parallel lips on 14
26 exit slit
28, 30 strips of velvet plush
32, 34 perforations
36 chemically activated visible indicator
37 adhesive carrier sheet
38 absorbent substrate
40 base receiver
42 transparent cover
44 opening in 40
46 outlet conduit
48 flexible container or source of liquid reagent
50 absorbent material
52 collapsible air inlet conduit/valve
54 pump lever
56 pivot
58 end of 54 engaging 48
60 down leg of 54
62 curved end of 60 to engage 32
64 air bubble
66 unactivated symbol on 38
67 contrasting color symbols or letters
68 activated symbol
70 opening in 40
72 plug
74 container for liquid reagent
76 outlet aligned with 70
78 pulling member
80 opening in 74 aligned with 76
82 down leg of 78
84 catch member or hook
86 perforation in 12
A transverse dimension of interior volume of 74
88 knee or corner of 78
90 capillary tube
92 quantity of reagent in 90
94 extension of 90
96 down leg of 90
98 catch member or hook
100 perforation in 12
102 knee or corner of 90
110 outlet conduit
112 flexible container or source of liquid reagent
114 absorbent material for reagent
116 clear, colorless portion of 42

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. A cartridge of photographic medium, comprising:
    a housing having an interior volume;
    an exit slit from said interior volume to an exterior of said housing;
    a photographic medium element enclosed within said interior volume;
    an indicator supported by one of said housing and said medium element, said indicator being responsive to a liquid reagent to change color and provide a visible indication of a status of said medium element;

a source of said liquid reagent supported by said one of said housing and said medium element; and means for causing flow of said reagent to said indicator upon movement of said medium element through said exit slit, whereby said indicator will change color and indicate said status.

2. A cartridge according to claim 1, wherein said medium element is a sheet of film.

3. A cartridge according to claim 1, wherein said medium element is a filmstrip.

4. A cartridge according to claim 1, wherein said indicator comprises a substrate capable of absorbing said reagent; and at least one symbol supported by said substrate, said symbol comprising a material which changes color upon exposure to said reagent when said reagent is absorbed by said substrate.

5. A cartridge according to claim 1, wherein said medium element is a strip having a longitudinally extended array of perforations; said indicator and said source are supported by said housing; said source comprises a flexible container of said reagent, said container having an outlet to said indicator; and said means for causing comprises a pump lever pivotably supported by said housing, said pump lever being engaged with said flexible container and having an end engaged with said strip at said array of perforations, whereby said movement of said strip causes said pump lever to oscillate as said end moves across said perforations, thereby pressing and expanding said flexible container to expel said reagent to said indicator.

6. A cartridge according to claim 5, wherein said flexible container comprises a valve for admitting air when said pump lever expands said flexible container.

7. A cartridge according to claim 5, wherein said medium element is a sheet of film.

8. A cartridge according to claim 5, wherein said medium element is a filmstrip.

9. A cartridge according to claim 5, wherein said indicator comprises a substrate capable of absorbing said reagent; and at least one symbol supported by said substrate, said symbol comprising a material which changes color upon exposure to said reagent when said reagent is absorbed by said substrate.

10. A cartridge according to claim 1, wherein said medium element comprises a perforation; said indicator and said source are supported by said housing; said source comprises a container of said reagent having an outlet to said indicator; and said means for causing comprises a plug member for closing said outlet, a pulling member engaged with said plug member, and a catch member for engaging said perforation, said catch member being connected with said pulling member, whereby movement of said medium element causes said catch member to engage said perforation, thereby moving said pulling member and extracting said plug member from said outlet to release said reagent to said indicator.

11. A cartridge according to claim 10, wherein said plug member is positioned within said container and said pulling member extends through a wall of said container opposite said outlet to engage said plug member.

12. A cartridge according to claim 11, wherein said container has an internal cross-sectional area greater than a flow area of said outlet, whereby said reagent can flow past said plug to said outlet after said plug is extracted from said outlet.

13. A cartridge according to claim 10, wherein said medium element is a sheet of film.

14. A cartridge according to claim 10, wherein said medium element is a filmstrip.

15. A cartridge according to claim 10, wherein said pulling member is adapted to break when said perforation has moved a predetermined distance from said exit slit, whereby said catch member can disengage from said perforation.

16. A cartridge according to claim 10, wherein said indicator comprises a substrate capable of absorbing said reagent; and at least one symbol supported by said substrate, said symbol comprising a material which changes color upon exposure to said reagent when said reagent is absorbed by said substrate.

17. A cartridge according to claim 1, wherein said indicator and said source are supported on said medium element; said source comprises a flexible container of said reagent, said container having an outlet to said indicator; and said means for causing comprises an edge of said exit slit which engages and presses said flexible container to expel said reagent to said indicator as said medium element moves into said housing.

18. A cartridge according to claim 17, further comprising a strip of light-lock material supported within said exit slit at said edge.

19. A cartridge according to claim 17, wherein said medium element is a sheet of film.

20. A cartridge according to claim 17, wherein said medium element is a filmstrip.

21. A cartridge according to claim 17, wherein said indicator comprises a substrate capable of absorbing said reagent; and at least one symbol supported by said substrate, said symbol comprising a material which changes color upon exposure to said reagent when said reagent is absorbed by said substrate.

22. A cartridge according to claim 1, wherein said medium element comprises a perforation; said indicator and said source are supported on said housing; said source comprises a capillary enclosing a quantity of said reagent, said capillary having a closed end and an outlet to said indicator; and said means for causing comprises a catch member for engaging said perforation, said catch member being connected to said capillary adjacent said closed end, whereby movement of said medium element causes said catch member to engage said perforation, thereby breaking said capillary to release said reagent to said indicator.

23. A cartridge according to claim 22, wherein said catch member is formed at least in part from a portion of said capillary.

24. A cartridge according to claim 22, wherein said medium element is a sheet of film.

25. A cartridge according to claim 22, wherein said medium element is a filmstrip.

26. A cartridge according to claim 22, wherein said capillary is adapted to break when said perforation has moved a predetermined distance from said exit slit, whereby said catch member can disengage from said perforation.

27. A cartridge according to claim 22, wherein said indicator comprises a substrate capable of absorbing said reagent; and at least one symbol supported by said substrate, said symbol comprising a material which changes color upon exposure to said reagent when said reagent is absorbed by said substrate.

28. An article of manufacture comprising:
 a photographic medium element;
 an indicator supported by said medium element, said indicator being responsive to a liquid reagent to change color and provide a visible indication of a status of said medium element;
 a source of said liquid reagent supported by said medium element; and
 a conduit between said indicator and said source.

29. An article according to claim 28, wherein said source comprises a flexible container of said reagent, said container having an outlet to said indicator.

30. An article according to claim 28, wherein said medium element is a sheet of film.

31. An article according to claim 28, wherein said medium element is a filmstrip.

32. An article according to claim 28, wherein said indicator comprises a substrate capable of absorbing said reagent; and at least one symbol supported by said substrate, said symbol comprising a material which changes color upon exposure to said reagent when said reagent is absorbed by said substrate.

33. An indicator apparatus for showing a status of a photographic medium element which is enclosed in a housing, said indicator apparatus comprising:

an indicator adapted to be supported by one of the housing and the medium element, said indicator being responsive to a liquid reagent to change color and provide a visible indication of a status of the medium element;

a source of said liquid reagent adapted to be supported by said one of the housing and the medium element; and means for causing flow of said reagent to said indicator upon movement of the medium element from the housing, whereby said indicator will change color and indicate said status.

34. An indicator apparatus according to claim 33, wherein said indicator and said source are mounted on an adhesive carrier.

35. An indicator apparatus according to claim 33, wherein said indicator comprises a substrate capable of absorbing said reagent; and at least one symbol supported by said substrate, said symbol comprising a material which changes color upon exposure to said reagent when said reagent is absorbed by said substrate.

36. An indicator apparatus according to claim 33, wherein said indicator and said source are mounted on a carrier to be supported by the housing; the medium element has a longitudinally extended array of perforations; said source comprises a flexible container of said reagent, said container having an outlet to said indicator; and said means for causing comprises a pump lever pivotably supported by said carrier, said pump lever being engaged with said flexible container and having an end for engaging the array of perforations, whereby when the indicator apparatus is mounted on the housing, movement of the medium causes said pump lever to oscillate as said end moves across the perforations, thereby pressing and releasing said flexible container to expel said reagent to said indicator.

37. An indicator apparatus according to claim 36, wherein said flexible container comprises a valve for admitting air when said pump lever releases said flexible container.

38. An indicator apparatus according to claim 36, wherein said indicator comprises a substrate capable of absorbing said reagent; and at least one symbol supported by said substrate, said symbol comprising a material which changes color upon exposure to said reagent when said reagent is absorbed by said substrate.

39. An indicator apparatus according to claim 33, wherein said indicator and said source are mounted on a carrier to be supported by the housing; the medium element comprises a perforation; said source comprises a container of said reagent having an outlet to said indicator; and said means for causing comprises a plug member for closing said outlet, a pulling member engaged with said plug member, and a catch member for engaging the perforation, said catch member being connected with said pulling member, whereby when the indicator apparatus is mounted on the housing, movement of the medium element causes said catch member to engage the perforation, thereby moving said pulling member and extracting said plug member from said outlet to release said reagent to said indicator.

40. An indicator apparatus according to claim 39, wherein said plug member is positioned within said container and said pulling member extends through a wall of said container opposite said outlet to engage said plug member.

41. An indicator apparatus according to claim 40, wherein said container has an internal cross-sectional area greater than a flow area of said outlet, whereby said reagent can flow past said plug to said outlet after said plug is extracted from said outlet.

42. An indicator apparatus according to claim 39, wherein said pulling member is adapted to break when the perforation has moved a predetermined distance from the housing, whereby said catch member can disengage from the perforation.

43. An indicator apparatus according to claim 39, wherein said indicator comprises a substrate capable of absorbing said reagent; and at least one symbol supported by said substrate, said symbol comprising a material which changes color upon exposure to said reagent when said reagent is absorbed by said substrate.

44. An indicator apparatus according to claim 33, wherein said indicator and said source are adapted to be supported on said medium element; said source comprises a container of said reagent, said container having an outlet to said indicator; and said means for causing comprises a flexible wail of said container which engages the housing to expel said reagent to said indicator as the medium element moves into the housing.

45. An indicator apparatus according to claim 44, wherein said indicator comprises a substrate capable of absorbing said reagent; and at least one symbol supported by said substrate, said symbol comprising a material which changes color upon exposure to said reagent when said reagent is absorbed by said substrate.

46. An indicator apparatus according to claim 33, wherein said medium element comprises a perforation; said indicator and said source are mounted on a carrier to be supported on the housing; said source comprises a capillary enclosing a quantity of said reagent, said capillary having a closed end and an outlet to said indicator; and said means for causing comprises a catch member for engaging the perforation, said catch member being connected to said capillary adjacent said closed end, whereby when the indicator apparatus is mounted on the housing, movement of said medium element causes said catch member to engage the perforation, thereby breaking said capillary to release said reagent to said indicator.

47. An indicator apparatus according to claim 46, wherein said catch member is formed at least in part from a portion of said capillary.

48. An indicator apparatus according to claim 46, wherein said capillary is adapted to break when said perforation has moved a predetermined distance from said exit slit, whereby said catch member can disengage from said perforation.

49. An indicator apparatus according to claim 46, wherein said indicator comprises a substrate capable of absorbing said reagent; and at least one symbol supported by said substrate, said symbol comprising a material which changes color upon exposure to said reagent when said reagent is absorbed by said substrate.

* * * * *